United States Patent
Spyker et al.

(10) Patent No.: US 6,571,389 B1
(45) Date of Patent: May 27, 2003

(54) SYSTEM AND METHOD FOR IMPROVING THE MANAGEABILITY AND USABILITY OF A JAVA ENVIRONMENT

(75) Inventors: Andrew W. Spyker, Raleigh, NC (US); Matthew David Walnock, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,041

(22) Filed: Apr. 27, 1999

(51) Int. Cl.$^7$ ................................................. G06F 9/44
(52) U.S. Cl. ........................ 717/176; 717/176; 709/106; 709/242
(58) Field of Search ............................. 711/11; 709/204, 709/106, 242; 717/168–178

(56) References Cited

U.S. PATENT DOCUMENTS

| | | | | |
|---|---|---|---|---|
| 5,732,275 A | * | 3/1998 | Kullick et al. | 717/11 |
| 5,752,042 A | * | 5/1998 | Cole et al. | 717/176 |
| 5,764,992 A | * | 6/1998 | Kullick et al. | 717/11 |
| 5,966,540 A | * | 10/1999 | Lister et al. | 717/178 |
| 5,983,348 A | * | 11/1999 | Ji | 713/200 |
| 5,995,756 A | * | 11/1999 | Herrmann | 395/712 |
| 6,009,274 A | * | 12/1999 | Fletcher et al. | 395/712 |
| 6,353,926 B1 | * | 3/2002 | Parthesarathy et al. | 717/168 |
| 6,357,019 B1 | * | 3/2002 | Blaisdell et al. | 714/38 |
| 6,381,742 B2 | * | 4/2002 | Forbes et al. | 717/178 |

* cited by examiner

Primary Examiner—Gregory Morse
Assistant Examiner—Chuck Kendall
(74) Attorney, Agent, or Firm—Jeanine S. Ray-Yarletts; Marcia L. Doubet

(57) ABSTRACT

A method, system, and computer-readable code for improving the manageability and usability of a Java environment. The advantages of applets and applications are combined, while avoiding particular disadvantages of both, resulting in a technique whereby all Java programs are executed without relying on use of a browser to provide a run-time environment. Techniques for improving the packaging of Java components, including run-time environments and extensions as well as applications, are defined. Dependencies are specified in a manner which enables them to be dynamically located and installed, and enables sharing dependent modules (including run-time environments) among applications. The dependency specification technique ensures that all dependent code will be automatically available at run-time, without requiring a user to perform manual installation. The run-time environment required for an application is specified, and a technique is provided for dynamically changing the run-time that will be used (including the ability to change run-times on a per-program basis), without requiring user intervention.

33 Claims, 11 Drawing Sheets

405 Property Key - displayname
   Displayname

408 Property Key - displayicon
   Display icon

410 Property Key - version
   Comma separated list in form of Major.Minor.Rev.Build version information

415 Property Key - jobbitype
   Either application, runtime, or extension
      application - Can be added to the jobbi desktop
      runtime - Can be added to the list of runtimes
      extension - Can be added to the list of extensions

420 Property Key - jobbilocationtype
   Either URL | file | jobbi-lookup-server
      URL - the jobbi archive is located at the URL specified in jobbilocation
      file - the jobbi archive is contained in a file name specified in jobbilocation
      jobbi-lookup-server - goes to the jobbi-server and looks up the location information

425 Property Key - jobbilocation
   Either a URL, filename, prompt, or '.'
      URL - URL pointing to jobbi archive
      filename - presents the user with a file chooser box specifying the name of the jobbi archive
428   prompt - presents the user with a dialog that either lets the user put in a URL or filename
      '.' - use of this syntax indicates that the jobbi archive is contained within the current archive

430 Property Key - nativecode
   Either true or false
      true - jobbi archive contains native code
      false - jobbi archive does not contain native code

435 Property Key - nativecodeplatform
   One of the strings of the jobbi supported platforms
   Empty if nativecode is false

440 Property Key - dependencies
   Comma separated list of UID's that this package depends on
   Empty if there are no dependencies for this jobbi package

445 Property Key - main
   Java class name of class containing the main() function. This field is only specified if
      jobbitype = application

FIG. 4B

Example
450

X1's entry 455
————————
displayname=x1's display name 459
displayicon=images|hod.gif 460
version=1,0,0,0 461
jobbitype=application 462
locationtype=file 463
location=. 464
nativecode=false 465
nativecodeplatform= 466
dependencies=X2,Y1 467
main=com.ibm.X1 468

X2's entry... 470
:::

X3's entry... 475
:::

Y1's entry 480
————————
displayname=y1's display name 481
displayicon=
version=1,0,0,0 482
jobbitype=runtime 483
locationtype=URL 484
location=http://myserver.ibm.com/runtimey1.jar 485
nativecode=true 486
nativecodeplatform=Win32 487
dependencies= 488
main= y2__...
:::
y3__...
:::

FIG. 6A

File format *600*

| Key | Value |
| --- | --- |
| *605* jobbi.uid | Unique identifier of this package. This can be any valid string |
| *610* jobbi.main | Java class containing the main() function. This is only specified when jobbi.type = 0 (application) |
| *615* jobbi.displayname | Displayable string |
| *620* jobbi.displayicon | Display icon path information |
| *625* jobbi.classdir | relative directory or archive name which needs to be included in the classpath when this package is used. |
| *630* jobbi.runtimelist | List of unique identifiers of runtimes in which this package can be executed |
| *635* jobbi.working | The relative working directory which needs to be set in order to use this package |
| *640* jobbi.type | 0 = application<br>1 = extension<br>2 = runtime |
| *645* jobbi.currentruntime | The unique identifier of the runtime which is to be used when this package is executed.<br>This is only set when jobbi.type = 0 |
| *650* jobbi.package | The archive name of this package. This is only specified when the package archive is not expanded into the UID directory of the Jobbi client installation. |
| *655* jobbi.extern | semi-colon separated list of unique identifiers on which this package is dependent |
| *660* jobbi.param | semi-colon separated list of parameters which are to be passed to the main function of the application |

The '|' character is used as a platform independent path separator.
The '&' character is used as a platform independent symbol for concatenation

FIG. 6B

Example 670

```
#Jobbi registry file for Host on Demand 3.0
#Thu Jan 21 23:19:26 EST 1999
jobbi.uid=00000001                                              671
jobbi.main=com.ibm.eNetwork.HOD.HostOnDemand                    672
jobbi.displayname=Host on Demand 3.0                            673
jobbi.displayicon=images|hod.gif                                674
jobbi.classdir=hod30dbg.zip&..                                  675
jobbi.runtimelist=10000001,10000002,10000004                    676
jobbi.working=.                                                 677
jobbi.type=0                                                    678
jobbi.currentruntime=10000004                                   679
jobbi.package=                                                  680
```

SYSTEM AND METHOD FOR IMPROVING THE MANAGEABILITY AND USABILITY OF A JAVA ENVIRONMENT

BACKGROUND OF THE INVENTION

1. Field of the Invention

The present invention relates to a computer system, and deals more particularly with a method, system, and computer-readable code for improving the manageability and usability of a Java environment.

2. Description of the Related Art

Java is a robust, portable object-oriented programming language developed by Sun Microsystems, Inc., and which is gaining wide acceptance for writing code for the Internet and World Wide Web. While compilers for most programming languages generate code for a particular operating environment, Java enables writing programs using a "write once, run anywhere" paradigm. ("Java" and "Write Once, Run Anywhere" are trademarks of Sun Microsystems, Inc.)

Java attains its portability through use of a specially-designed virtual machine ("VM"). This virtual machine is also referred to as a "Java Virtual Machine", or "JVM". The virtual machine enables isolating the details of the underlying hardware from the compiler used to compile the Java programming instructions. Those details are supplied by the implementation of the virtual machine, and include such things as whether little Endian or big Endian format is used for storing compiled instructions, and the length of an instruction once it is compiled. Because these machine-dependent details are not reflected in the compiled code, the code can be transported to a different environment (a different hardware machine, a different operating system, etc.), and executed in that environment without requiring the code to be changed or recompiled—hence the phrase "write once, run anywhere". The compiled code, referred to as Java "bytecode", then runs on top of a JVM, where the JVM is tailored to that specific operating environment. As an example of this tailoring of the JVM, if the bytecode is created using little Endian format but is to run on a microprocessor expecting big Endian, then the JVM would be responsible for converting the instructions from the bytecode before passing them to the microprocessor.

Programs written in Java take two forms: applications and applets. Java applets are applications that are intended to be downloaded to a user's machine with a Web page, and run within the Web browser that displays the Web page. Since Java was introduced in 1995, it has gone through a number of dramatic changes in a very short period of time. During this evolution, number of advantages and disadvantages of using applications versus applets have come to light.

One of the areas of difference between applications and applets is in the Java runtime environment, as well as the affect of changes thereto. (The runtime environment includes the JVM, as well as a number of files and classes that are required to run Java application or applets. Hereinafter, the terms "JVM" and "runtime environment" will be used interchangeably unless otherwise noted.) For applets, only a single level of the JVM exists in a given version of a browser. In order to upgrade the JVM level to keep pace with changes to the language, a new version of the browser must be installed. And, as new levels of browsers are installed on client machines, developers must update and maintain the Java code, recompiling (and retesting) it to match the browser's JVM level. In addition, evolution of the Java language has in some cases resulted in functionality (such as specific application programming interfaces, or "APIs") being deprecated between Java levels. This means that applets written in Java version 1.0.2, while they work in Java version 1.1, may not work when the browsers adopt the next version, Java 2. To continue using an applet written in an older Java version without changing the applet, an older JVM level (and therefore an older browser) must be used. While this approach solves the problem of running applets written in older Java versions, it typically does not enable deployment of new applets within this browser, because development tools typically cease supporting generation of code in the older levels. Furthermore, as defects in existing browser JVMs are identified, applet developers often create work-arounds while waiting for JVM developers to fix the problem. Once the fixes are applied, the work-arounds may cause defects in the applet. In addition, obtaining the latest release of a browser does not necessarily imply that it will provide the latest release of the JVM level, as the level of JVM within a browser tends to lag behind the currently released JVM level by 6 to 8 months. This may mean that applets under development, which will be created using a development toolkit, are created using a newer JVM level than is available in the new browser.

For applications, changes to the run-time environment are easier to deal with, as most Java applications ship bundled together with their own level of the Java runtime and those that don't state the required level of the Java runtime. However, shipping a runtime with the application means that multiple copies of the same JVM level may be installed on the client, leading to wasted storage space. When the application is not bundled with its runtime, on the other hand, the user is responsible for making sure that the correct JVM level is installed and the application is set up to use that level. Changing the runtime level so that a Java program can run, and making sure that all system settings are appropriate for the new level, is a difficult task for an end user to perform in today's environment. One solution to this problem is to write Java programs so that they will run correctly across multiple Java runtime levels. This, however, is a very difficult task for a developer, and is therefore not a viable solution.

A further issue in the run-time environment for applets is differences in how browsers from different vendors implement a particular JVM level. The browsers most commonly used today are Netscape Navigator and Internet Explorer. Because an applet developer typically has no way of predicting which browser (or browsers) will be used to run his application, good development practice calls for testing the applet with each potential browser. As will be readily apparent, the time spent testing an applet grows significantly when it is tested for multiple browsers, multiple JVM levels within each browser, etc. (as well as possibly testing implementations of the browsers on different operating system platforms). Sun Microsystems has attempted to address inter-browser differences (which also provides a way of making the latest run-time level available for applet execution) by providing a Java Plug-In which allows applets to be executed using a run-time environment provided by Sun, instead of the run-time provided by the browser. A JVM level can be selected from among those supported by the plug-in. However, this approach requires a user to understand which is the required JVM level and how to select it. In addition, the plug-in still provides a single level of a JVM until the user manually selects a different level, and therefore does not address the problems discussed above related to differences between JVM levels.

For applications, differences in JVM implementations manifest themselves differently. Typically, there is only one version of each JVM level per operating system platform. It may be easier for a developer to predict which operating system his applications will run on than it is to predict which browser will be used for executing applets. Thus, the test and support requirements are significantly simpler for applications than for applets. Synchronization between the JVM level used in application development and the JVM level used for executing the resulting application, as well as the synchronization problems related to fixing errors, are less likely to present a problem, compared to the situation for applets that was discussed above. This is because both the development and runtime environment for applications are likely to be provided by the same vendor. In addition, when it is desirable to run an application on an older JVM (for example, due to changes such as function being deprecated, as previously discussed), this is less troublesome for an application than for an applet. The only requirement with the application scenario is that the older JVM is still available.

Another significant difference between applications and applets is their ease of use for end-users. Java-enabled browsers make it very easy for a user to run Java applets, where the user is required to do nothing more for execution than pointing the browser at the applet and clicking on a button. The user needs to know very little about the Java language and applets, and may not even realize that an applet is being invoked. Therefore, users do not need to be trained in how to run Java applets, saving time and money. Running a Java application (i.e. running a Java program outside a browser), on the other hand, is considerably more complicated. A Java application can be run from a development toolkit such as the JDK (Java Development Kit) product from Sun Microsystems; alternatively, the application may be run using the "JRE" (Java Runtime Environment) product (hereinafter, "JRE"), also from Sun Microsystems. The JRE is a subset of the JDK, providing the functionality which is required for application execution. Programs are executed from the command line when using the JRE. Running an application in either the JDK or JRE requires a fair amount of knowledge about the Java language and its environment. For example, the linked library paths and classpath environment variable must be properly set, and may change for each different application program. A number of dependencies may exist for running a particular application. For example, if the application makes use of a Java extension such as the Swing user interface components, the Swing libraries must be available. If the code for the extensions is not already installed on a user's machine, it may be difficult for an average user to locate the code and then perform a proper installation (i.e. including setting all the required variables to enable the class loader to find the code at run-time). In addition, a user must understand how to operate the JDK or JRE for program execution. While Java developers and system administrators may readily understand these types of information, it is not reasonable to place this burden on the average end-user who simply wants to execute a program.

Several problems related to differences between browser implementations have been discussed. Two additional problems are differences in support for security features, and differences in archive formats. Security features are used in an applet by invoking the security APIs provided by the browser. The primary browsers in use today have different security APIs. This forces an applet developer to write (and test) security code that is different between the browsers, increasing the cost of providing the applet code. While the "CAB" (for "cabinet") file format is used for distributing and archiving files for the Internet Explorer browser, "JAR" (for "Java archive") file format is used to distribute and archive Java applet files.

Accordingly, a need exists for a technique by which these shortcomings in the current Java environment can be overcome. Ideally, the advantages of applets and the advantages of applications should be combined, providing an environment which then avoids the disadvantages of each. The present invention defines a novel approach to solving these problems, which will result in programs that are easier to use, and less costly to provide.

SUMMARY OF THE INVENTION

An object of the present invention is to provide a technique whereby shortcomings in the current Java environment can be overcome.

Another object of the present invention is to provide a technique whereby the advantages of applets and the advantages of applications are combined, providing an environment which then avoids the disadvantages of each.

It is another object of the present invention to provide a technique that enables dynamically switching among run-time environments for Java programs, on a per-program basis.

It is yet another object of the present invention to provide this technique in a manner that enables a user to easily switch between different run-time environments.

A further object of the present invention to provide a technique for specifying the dependencies of a Java application, including which run-time environment is required.

Yet another object of the present invention to provide this technique in a manner that enables the dependencies to be located automatically, and downloaded and installed, without requiring a static specification of location information.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer-readable code for use in a computing environment capable of having a connection to a network, for improving the manageability and usability of a Java environment. This technique comprises: defining a plurality of properties for a Java application, wherein the properties describe the application, zero or more extensions required for executing the application, and a run-time environment required for executing the application; and storing the defined properties along with an identification of the application. This technique may further comprise installing the application on a client machine using the stored properties. Preferably, installing the application further comprises: installing one or more dependencies of the application, wherein the dependencies comprise the required extensions and the required run-time environment; and installing a Java Archive file for the application on the client machine, and this installing dependencies further comprises: parsing the properties to locate the dependencies; determining whether each of the dependencies are already installed on the client machine; and retrieving and installing the located dependency when it is not already installed. Optionally, the technique may further comprise retrieving a latest version of the stored properties for the application prior to operation of installing the one or more dependencies. The installing one or more dependencies may further comprise dynamically retrieving a location for use in said retrieving and installing. In one aspect, the technique may further comprise creating a registry file on the client machine corresponding to the properties. In this aspect, the technique preferably further comprises: receiving a request to execute a selected application on the client machine; constructing a proper run-time environment for the selected application using a corresponding registry file; and starting execution of the selected application in the constructed environment. The constructing may further comprise: reading the corresponding registry file to determine current dependencies of the application, wherein the current dependencies comprise currently-required extensions and a current run-time environment for the application; ensuring that each of the current dependencies of the selected application is installed; setting appropriate environment variables for the current run-time environment; and setting appropriate environment variables for the currently-required extensions. Optionally, the technique may further comprise: updating the current run-time environment in the registry file; and updating the currently-required extensions in the registry file. In addition, the technique may further comprise setting one or more parameters of the selected application using the corresponding registry file, and may provide for updating the parameters in the registry file.

The present invention will now be described with reference to the following drawings, in which like reference numbers denote the same element throughout.

BRIEF DESCRIPTION OF THE DRAWINGS

FIG. 4A defines the layout of the properties information used by the present invention, and FIG. 4B depicts an example of using this layout for a particular application program;

FIG. 6A defines the layout of the registry file used by the present invention, and FIG. 6B depicts an example of using this layout for a particular application program;

DESCRIPTION OF THE PREFERRED EMBODIMENT

Figure 1:
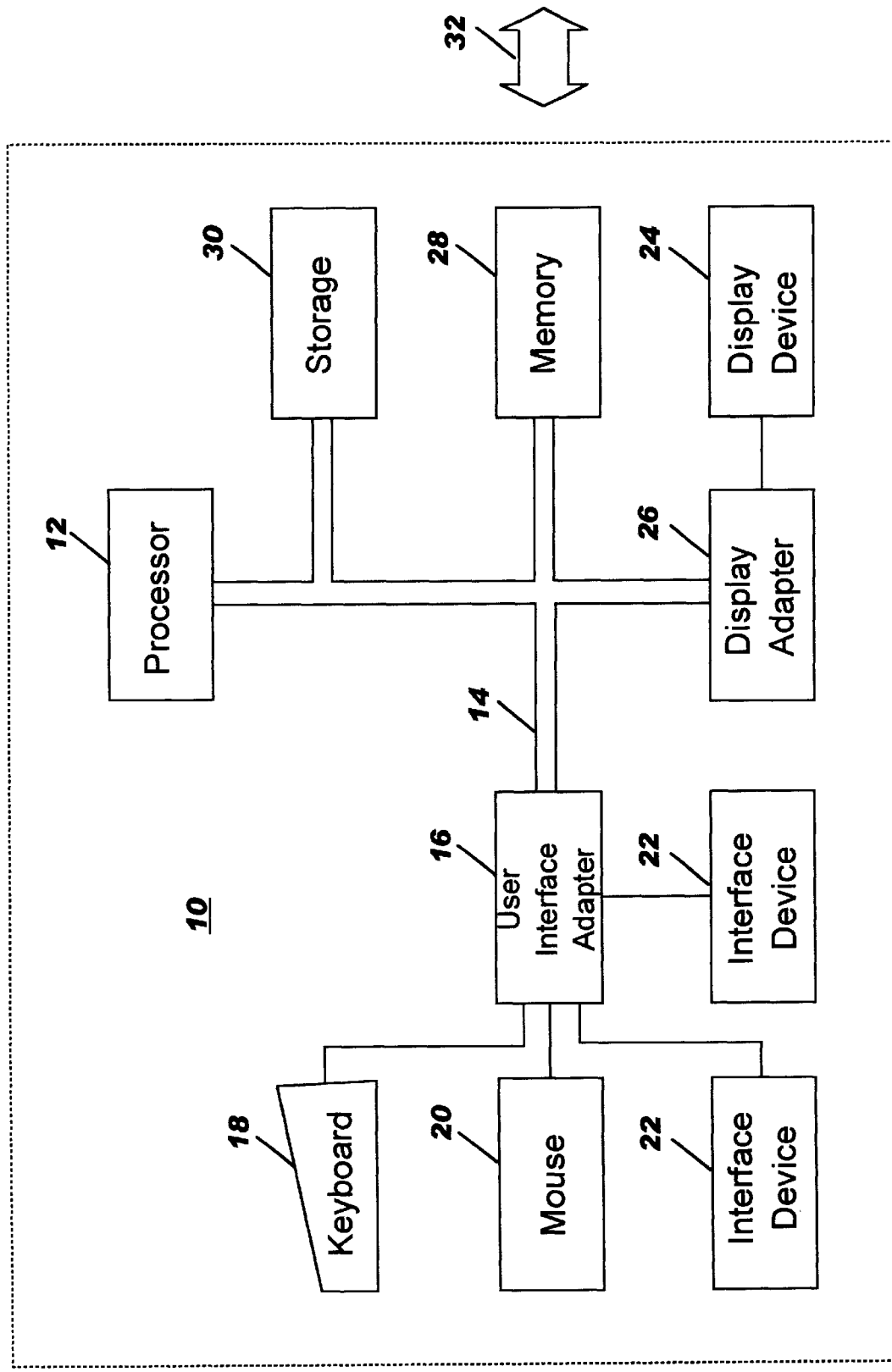
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
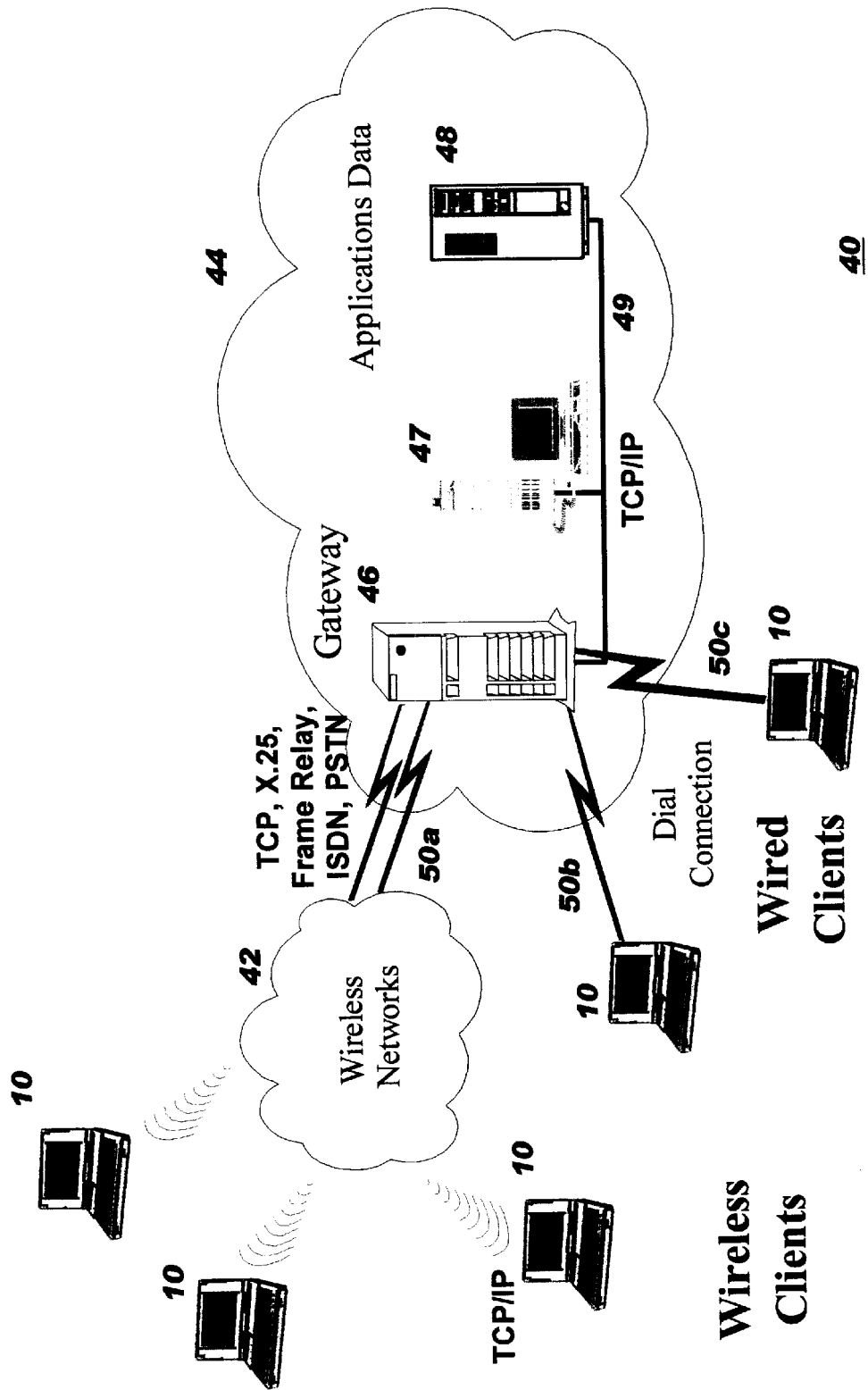
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, or an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using the Transmission Control Protocol/

Internet Protocol ("TCP/IP") over a number of alternative connection media, such as cellular phone, radio frequency networks, satellite networks, etc. The wireless network 42 preferably connects to the gateway 46 using a network connection 50*a* such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50*b* or 50*c*. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as a computer software program. Availability of a network connection is assumed, which must be operable at the time when the dynamic loading software on a user's workstation is invoked. In the preferred embodiment, the present invention is implemented as one or more modules (also referred to as code subroutines, or "objects" in object-oriented programming). The server to which the client computer connects may be functioning as a Web server, where that Web server provides services in response to requests from a client connected through the Internet. Alternatively, the server may be in a corporate intranet or extranet of which the client's workstation is a component. The present invention operates independently of the communications protocol used to send messages or files between the client and server, although the HTTP (Hyper Text Transfer Protocol) protocol running on TCP/IP is used herein as an example when discussing these message flows.

The present invention addresses a number of shortcomings in the Java environment, as will be discussed herein. The present invention also enables applets to be run without use of a browser, as if the applet was an application (and therefore all executable programs will be referred to hereinafter as "applications"). In this manner, the advantages of applets and the advantages of applications are combined. In particular, the disadvantages discussed earlier related to synchronizing applet code with the JVM level in a browser, different security APIs to invoke per browser, and the need to support multiple file archival formats are avoided by no longer using the browser as an execution environment. The acronym Jobbi—which stands for "Java code Outside the Browser By IBM"—is used herein to refer to the implementation of the present invention. Each application in Jobbi has a properties file associated with it. The information in the properties file is used to describe the requirements of an application, much as an applet tag would describe an applet's requirements in the current art. Using this properties information, each application program can specify its dependencies—including the particular runtime environment that the application should run on—as well as the environment settings that are required for running the application. Multiple run-time environments (i.e. multiple versions of a JVM or JRE) can exist on a client machine, where a single (shareable) copy of each run-time is accessible to those application programs which need it. A technique is defined herein for dynamically switching to the run-time environment which is required for a particular application, using information in the properties file. This is accomplished with little or no input from a human user. In this manner, older JVM levels are just as easily accessible for use at run-time as newer levels, freeing application developers from the need to update, recompile, and retest applications just to keep up with the moving target of the JVM level within the most recently released browser or operating system platform run-time environment.

The preferred embodiment of the present invention will now be discussed in more detail with reference to FIGS. 3 through 8.

Figure 3:
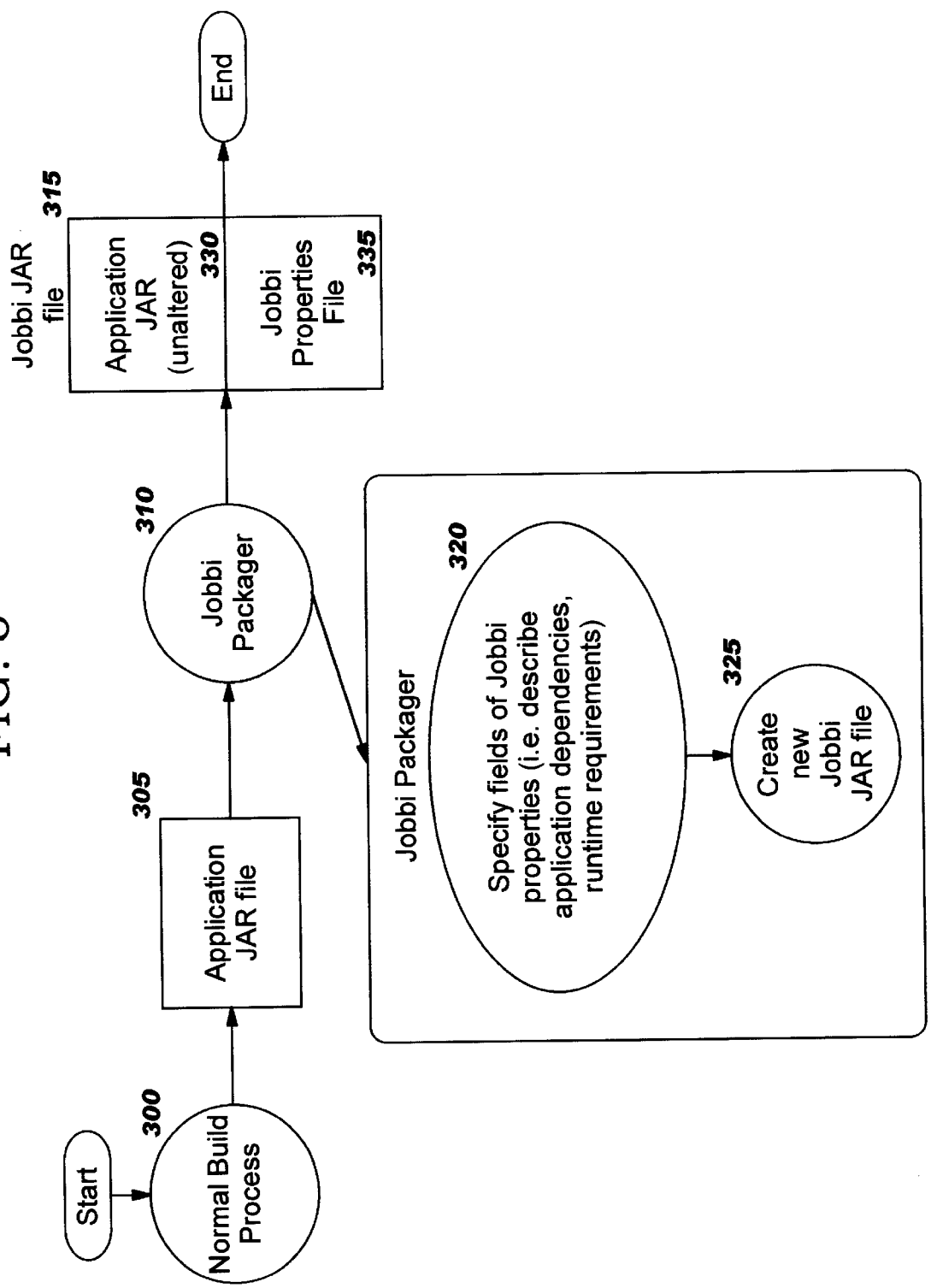
FIG. 3 depicts the technique with which the preferred embodiment of the present invention associates properties with a Java application, and stores those properties for later use.

FIG. 3 illustrates the technique with which the preferred embodiment of the present invention associates properties with a Java application, and stores those properties for later use. The format of the properties information defined by the present invention, and an example of using this information for a particular application, is shown in FIGS. 4A and 4B, respectively.

The properties definition process shown in FIG. 3 is a stand-alone process performed by an application developer, and is preferably integrated into the normal application build process which the developer uses during application development. Block 300 indicates that the developer performs this normal build process, which will use techniques that are known in the art. The output of this build process is a Java Archive file, also known as a "JAR" file, as indicated at Block 305. The present invention does not change the JAR file content. Block 310 shows the "Jobbi packager" of the present invention being invoked. This packaging step is illustrated in more detail at Blocks 320 and 325. At Block 320, the developer specifies values for the applicable properties of the application, using his knowledge about the application's requirements. These properties include application dependencies, run-time requirements, etc., as will be described in more detail below with reference to FIG. 4. A new JAR file, designated a Jobbi JAR file, is created as a result at Block 325. This Jobbi JAR file is then stored in an archive for later use, as depicted at Block 315 of the mainline flow, in a manner similar to the way in which existing JAR files are stored. As shown in FIG. 3, the Jobbi JAR file that will be archived at Block 315 includes the JAR file created according to the prior art for the application (as indicated by element 330), and also the Jobbi properties information (indicated by element 335). From this archive, all information needed to operate the application in a Java environment is available. (Note that while FIG. 3 indicates storing both the existing archive data 330 and the Jobbi information 335 together, this is merely one technique that may be used. Alternatively, these two types of information can be separately stored without deviating from the present invention, provided that the Jobbi properties are associated with the archived application information. This association may be implemented, for example, by storing a pointer or other reference in the JAR file, which identifies the associated Jobbi properties file; or, such a pointer or reference may be stored in the Jobbi properties file, pointing back to the JAR file.)

In an alternative embodiment, the operations depicted in Block 310, 320, and 325 could be separated in time from the operation of the normal build process and JAR file creation, without deviating from the inventive concepts of the present invention. When this alternative approach is used, the JAR file created at Block 305 would be stored as in the current art. When the properties information is subsequently created for the application, the stored JAR file for the application would be located, and the properties information would then be associated or stored therewith, as described with reference to FIG. 3.

FIG. 4A defines the properties information and file layout 400 contemplated by the preferred embodiment of the present invention. The layout 400 will be explained with reference to the example 450 of FIG. 4B, which illustrates the properties information for a hypothetical application. The properties information defined in this layout provides a standardized means for packaging not only applications, but also Java run-times and Java extensions. Different types of information are pertinent to each of these types of packaged content. Ten different types of property values are shown in the layout, at elements 405, 408, 410, 415, 420, 425, 430, 435, 440, and 445. (While these ten types of information are used for the preferred embodiment, it will be obvious to one of ordinary skill in the art that additional or different values may be used in a proper setting, without deviating from the inventive concepts disclosed herein. In addition, other names may be used for the properties instead of those shown, and the order of entries may be changed from the order shown.)

Some of the information in the properties file describes the application, run-time, or extension, and other information describes its dependencies. Each individual entry will now be discussed. The first element 405 is the display name to be used for this application. The display name may be used, for example, in displaying the icon which the user will use to invoke the application. For a hypothetical application "X1", as indicated at element 455 of FIG. 4B, the display name entry syntax is shown at 459. The name of the property appears first, which in this case is "display name". The value for the property is shown as "x1's display name". For a subsequent entry 480 in the properties file, which pertains to a run-time named "Y1" (see comment entry 480), the display name 481 is illustrated as "y1's display name". (Note that in the example of FIG. 4B, the equal sign has been used to separate the property names from their value. This is merely one separator that could be used.) Properties entry 408 specifies a display icon to be used for application files, an example of which is illustrated at 460. The value of this entry will be a file name where an icon is stored as an image, bitmap, etc. Within this property value, the "|" character is used in the preferred embodiment to indicate the path separator, and has been used in the path specification "images|hod.gif" of element 460. (This "|" symbol will be replaced on installation of the registry into the client machine, as further discussed below with reference to FIG. 6.)

The next property entry 410 is for the version of the packaged item. In the preferred embodiment, this information will be specified as a comma-separated list comprising the major, minor, revision, and build version numbers. This version information identifies which particular version of an application, run-time, or extension the properties information pertains to. For application X1 of FIG. 4B, the version syntax is shown at element 461. For run-time Y1, the version is shown at 482. Version syntax other than the comma-separated list of the preferred embodiment may be used when appropriate, to match the syntax used in a particular installation.

Property entry 415 identifies the type of information being described by this entry in the properties file. The type may be application, runtime, or extension. As shown at 462 and 483 of FIG. 4B, the keywords "application" and "runtime" have been used. Alternatively, other techniques may be used to convey the type, such as assigning numeric values (such as 0 through 2) to the packaged items.

The location type of the packaged item is specified using the property entry at 420. This location type 420 is used along with the location entry 425. As described in FIG. 4A, the location type may be "URL" (Uniform Resource Locator), in which case the location entry specifies a network location from which the archived package item can be retrieved. An example of using a URL is shown at elements 484 (where the type is identified using the "URL" keyword) and 485 (where an example URL is specified) of FIG. 4B. The location type 420 may alternatively be "file", in which case the location 425 specifies information for a directory structure in which the file is located. An example of using a file location is shown at elements 463 and 464 of FIG. 4B. In the example location shown at 464, the special character "." has been used to indicate that the archived information is in the current JAR file. In that case, there is no need to specify a location value 425 in the properties file. (While the preferred embodiment uses the special character "." to indicate this situation, other techniques such as a special keyword may alternatively be used.) When referring to archived information within a JAR file, a unique identifier or "UID" that uniquely identifies the information within the JAR file may be used. The location type 420 may also be specified as "jobbi-lookup-server", which means that the location will be determined dynamically at run-time (as will be discussed below with reference to FIG. 5B). In this case, the location value 425 will preferably be left empty. The location 425 may be specified using the keyword "prompt", as indicated at 428. In this case, the user will be prompted to enter the location information. (In the preferred embodiment, the keyword for the property type will appear in the property file, followed by the separator syntax, without an associated value when the value is empty.) As described above with reference to entry 415, shorter identifiers such as numeric values may be used instead of the keywords for entry 420.

Property entry 430 specifies whether the archived package item contains native code. This entry 430 is used in conjunction with entry 435, which specifies a string identifier of the native code platform when the value of entry 430 is "true". Examples of using these entries are shown at elements 465 and 466, where the native code value is false, and at elements 486 and 487, where the native code value is true.

Dependencies for this package item are specified using property entry 440. In the preferred embodiment, the dependency syntax uses a comma-separated list of UIDs for code that must be installed for this package item to run on any single platform. If there are no dependencies, then the value for this property will preferably be left empty. Element 467 shows an example of dependency information, where two identifiers "X2" and "Y1" are listed. As shown at elements 470 and 480, property information will also be provided for these dependencies. Element 488 shows that the example run-time Y1 has no dependencies. By specifying the dependencies within the archived package, all Java-specific information needed to install and use the package is available. For example, an application such as X1 (see element 455 of FIG. 4B) specifies the run-time environment "Y1" which it needs as a dependency at 467.

Property entry 445 defines the final entry of the preferred embodiment, which is the Java class name of the class containing the main( ) function. This entry has an empty value unless the package item is an application. The value listed for this entry will be, used at run-time to launch the application. As shown for application X1 at element 468, the main function for this application is located in the class "com.ibm.X1".

Figure 5A:
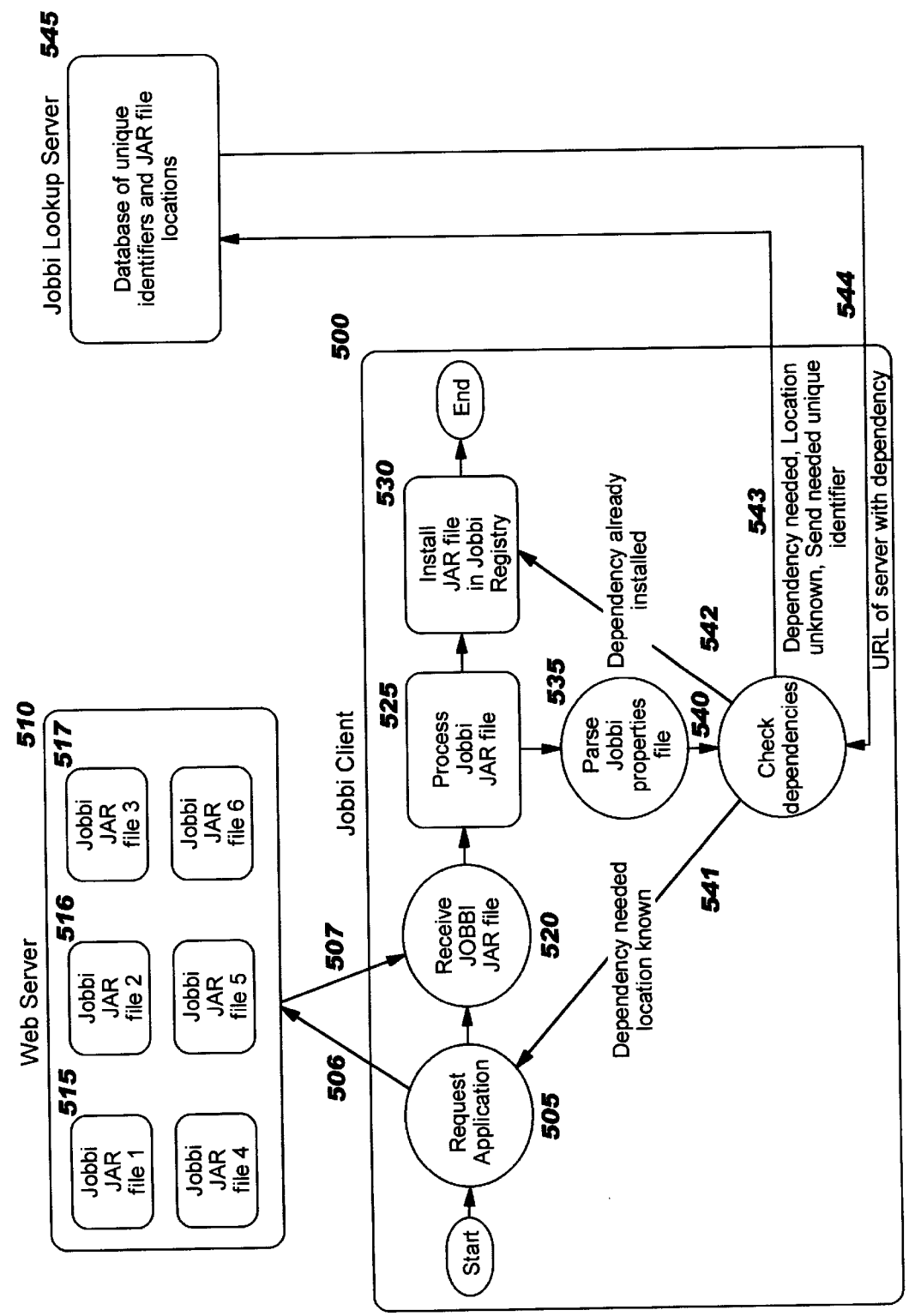
FIGS. 5A and 5B show the logic used in the preferred embodiment to locate and install dependencies for an application program, and the logic used in the preferred embodiment to install the Jobbi JAR file for an application program on a client's computer.
Figure 5B:
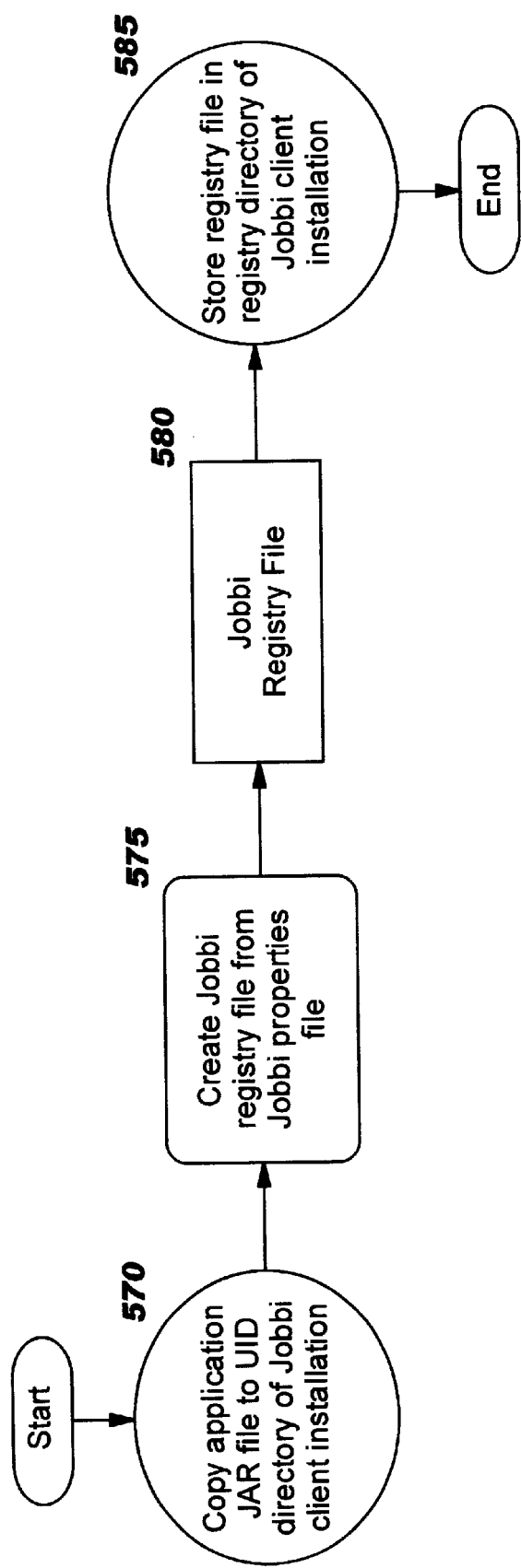

FIG. 5A shows the logic used in the preferred embodiment to locate and install dependencies for an application program, and FIG. 5B shows the logic used in the preferred embodiment to install the Jobbi JAR file for an application program on a client's computer. As depicted at 500, the logic of the dependency installation operates on the client's computer. This logic may be invoked in a stand-alone manner, to ensure that the dependencies for an application are installed. Alternatively, it may be invoked during execution of an application, as will be further discussed below with reference to Block 730 of FIG. 7. Dependency installation for a particular application is requested at Block 505. In the preferred embodiment, an HTTP request is sent 506 to a Web server 510, where that Web server 510 stores Jobbi JAR files 515, 516, 517, etc. which were created using the technique described above with reference to FIG. 3. This HTTP request will specify a unique identifier for the requested application. The associated Jobbi JAR file will be located by the Web server 510, and returned 507 to the client machine. Block 520 indicates that this file is received at the client machine, and is subsequently processed at Block 525. The processing of the Jobbi JAR file is explained in further detail in Blocks 535 and 540. The properties information (see FIG. 4) is parsed at Block 535 to locate the dependencies for the application requested at Block 505. When the dependency information is extracted, Block 540 checks to see whether the dependent item is installed. This checking process may have 3 outcomes, indicated at flows 541, 542, and 543. If the dependency (or dependencies) is/are already installed, then processing continues at Block 530 as indicated by flow 542. If there are dependencies, and the location of the dependency is known, then control returns to Block 505 as indicated by flow 541. As will be obvious to one of ordinary skill in the art, this is a recursive invocation of the dependency installation process. This recursive invocation may be used to retrieve the run-time needed for the requested application, extensions needed for the application, etc. If a dependency is needed but its location is not known (for example, the value of property entry 420 is specified as "jobbi-lookup-server"), then the unique identifier of the dependency will be sent to a lookup server 545, as indicated at flow 543. This lookup server 545 will return the associated Jobbi JAR file location to the client machine, as indicated by flow 544. In the preferred embodiment, this returned information is a URL specifying the location of the server where the archived information is stored. Now that the location of the dependency is known, a recursive invocation of the dependency installation process is invoked using flow 541. This technique of determining the location of a dependency dynamically enables the present invention to provide packaging that is very flexible, as contrasted to the current art where such location information must be statically pre-specified. (Note that while a single Web server 510 is depicted in FIG. 5A, this is for illustrative purposes. More than one server may be used, where the HTTP request 506 will specify the appropriate server using its URL.)

The dependency checking process of Block 540 will be repeated for each specified dependency. The determination of whether a dependency is already installed uses techniques which are known in the art. Once the dependencies have been fully processed as described with reference to Blocks 535 and 540, control returns to the mainline processing in Block 530, where the Jobbi JAR file retrieved at 507 is installed into a Jobbi registry on the client machine. This process is described in more detail in FIG. 5B.

The installation process used to install the Jobbi JAR file for an application program on a client's computer begins at Block 570 of FIG. 5B, where the application's JAR file is extracted from the Jobbi JAR file (when the two have been stored together; see element 315 of FIG. 3) and copied to the UID directory of the client machine. (The UID directory is a directory created on the client's machine, having the same name as the UID of the Jobbi archive whose contents are contained therein. This technique facilitates finding the Jobbi archive information when subsequently setting up the environment for the application. Alternatively, other directory naming approaches may be used, in which case the name of the directory used to store the archived information for an application must be stored as part of the registry file.) Block 575 then uses the Jobbi properties information from the Jobbi JAR file, and creates a registry file from this properties information. The format of the registry file is depicted in FIG. 6, and is discussed in detail below. The registry file information 580 is then stored at Block 585 in the registry directory for this client machine. The process of FIG. 5B then ends.

FIG. 6A defines the layout 600 of the registry file used by the present invention, and FIG. 6B depicts an example 670 of using this layout for a particular application program. Whereas the properties file contains information needed to use an application on a number of platforms on which it may be installed, the registry provides tailored information about using the application on this particular client machine. At run-time, the registry information will be used to construct the proper environment for the application, as will be discussed below with reference to FIG. 7. A number of registry entries are extracted directly from the properties file information during the processing of Block 575 of FIG. 5B, as will be described herein. (In a similar manner as described with reference to the property file layout 400 in FIG. 4A, the registry file layout 600 depicts the preferred embodiment, and may pertain to an application, a runtime, or extensions. This layout information may be changed or extended in a proper environment, it may be reordered, and other keywords may be used instead of those shown.)

The registry entry 605 specifies a unique identifier of this package, which can be any valid string. The identifier may be generated, e.g., by invoking the function of a random number generator, or by other techniques (including user input) which do not form part of the present invention. An example identifier string is shown at element 671 of FIG. 6B. Note that the registry entries have been prefixed with the syntax "jobbi" in this example: this is for illustrative purposes only, and clearly indicates that these are entries in the Jobbi registry.

Registry entry 610 is used to specify the Java class containing the main( ) function. This information is extracted from entry 445 of the properties file, during the processing of Block 575 of FIG. 5B, provided that the properties file is that of an application. An example of using this entry 610 is shown at element 672 of FIG. 6B, where a particular class name is specified. Registry entry 615 is the display name of this package, and can be any displayable string value. This value is extracted from properties entry 405, and is illustrated in the example 670 at element 673. Entry 620 specifies a display icon to be used for application files, an example of which is illustrated at 674. The value of this entry will be a file name where an icon is stored as an image, bitmap, etc. As indicated in the note at the bottom of FIG. 6A, the "|" character is used in the preferred embodiment to indicate the path separator, and has been used in the path specification "images|hod.gif" of element 674. This "|" symbol will be replaced on installation of the registry into the client machine, to use the "\" or "/" character, as appropriate for the client's operating system. The value of this entry 620 is extracted from element 408 of the properties file.

The relative directory or archive name which needs to be included in the classpath environment variable when this package is used is specified using registry entry 625. The value used for this entry is created automatically, and is the location in the file system of the client machine where the archived package is stored. An example is shown at 675. Note that the symbol "&" has been used, indicating that the platform-specific symbol for concatenation is to be used to replace this symbol on installation of the registry on the client's machine (as explained in FIG. 6A).

Registry entry 630 specifies a list of unique identifiers of run-time environments in which this package can be executed. This list may be initially constructed using information from the properties file, where the dependencies for the package are inspected to locate each runtime for the package. In addition, user or developer input may be used subsequently, to extend the values in this list. Element 676 shows that in this example application, any of three different run-time environments (identified in the example as "10000001", "10000002", and "10000004") may be used to execute the application.

The relative working directory which needs to be set as an environment variable is specified as the value of registry entry 635. The special syntax "." is used in the example at 677, indicating the current directory is to be used. This value is preferably created by initializing it to the value ".", and providing a means (such as a configuration menu) with which the value can subsequently be changed if needed.

The type of item described by the registry information is specified using entry 640, and will be either application, extension, or run-time. Element 678 indicates that the example pertains to an application, using the application value of 0. The value of this entry is deduced from the properties file entry 415.

Registry entry 645 specifies the currently-selected run-time environment to be used for an application. This entry is omitted from the registry file for run-times and extensions. An example run-time identifier is shown at 679, which corresponds to the final choice from the list of run-times in element 676. The value to be used for entry 645 will be chosen from the values in entry 630. Preferably, a selection policy will be used for a particular implementation, such as choosing the final element from a list of choices, or choosing the first element, etc. Alternatively, a user may be prompted to select from the list.

The package entry 650 specifies the archive name for the package, identifying where it is stored on a server in the network using a URL or where it is stored in a file system using a file path. If the archived package has been expanded and installed into the UID directory of the client's machine, then the value of this entry is left blank, as shown by element 680.

The extern entry 655 is a semi-colon separated list of the unique identifiers on which this package is dependent, and is created from entry 440 of the properties file. When there are no dependencies, then this entry may be completely omitted from the registry file, as has been done in the example 670.

The final entry in the preferred embodiment of the registry file is the parameters entry 660. This is a list of parameters, preferably separated using semi-colons, which will be passed to the main( ) function upon invocation of the application. Accordingly, this entry is not specified unless the registry type 640 is application. Typically, the parameter values will be entered by a user during the application launch process, and thus no parameter values will be stored persistently in the registry file. However, it may be that one or more parameters has a somewhat constant or fixed value. In that case, the value(s) may be stored in the registry, avoiding the need to prompt the user to enter the values at run-time. The example 670 omits specification of parameter values.

Figure 7:
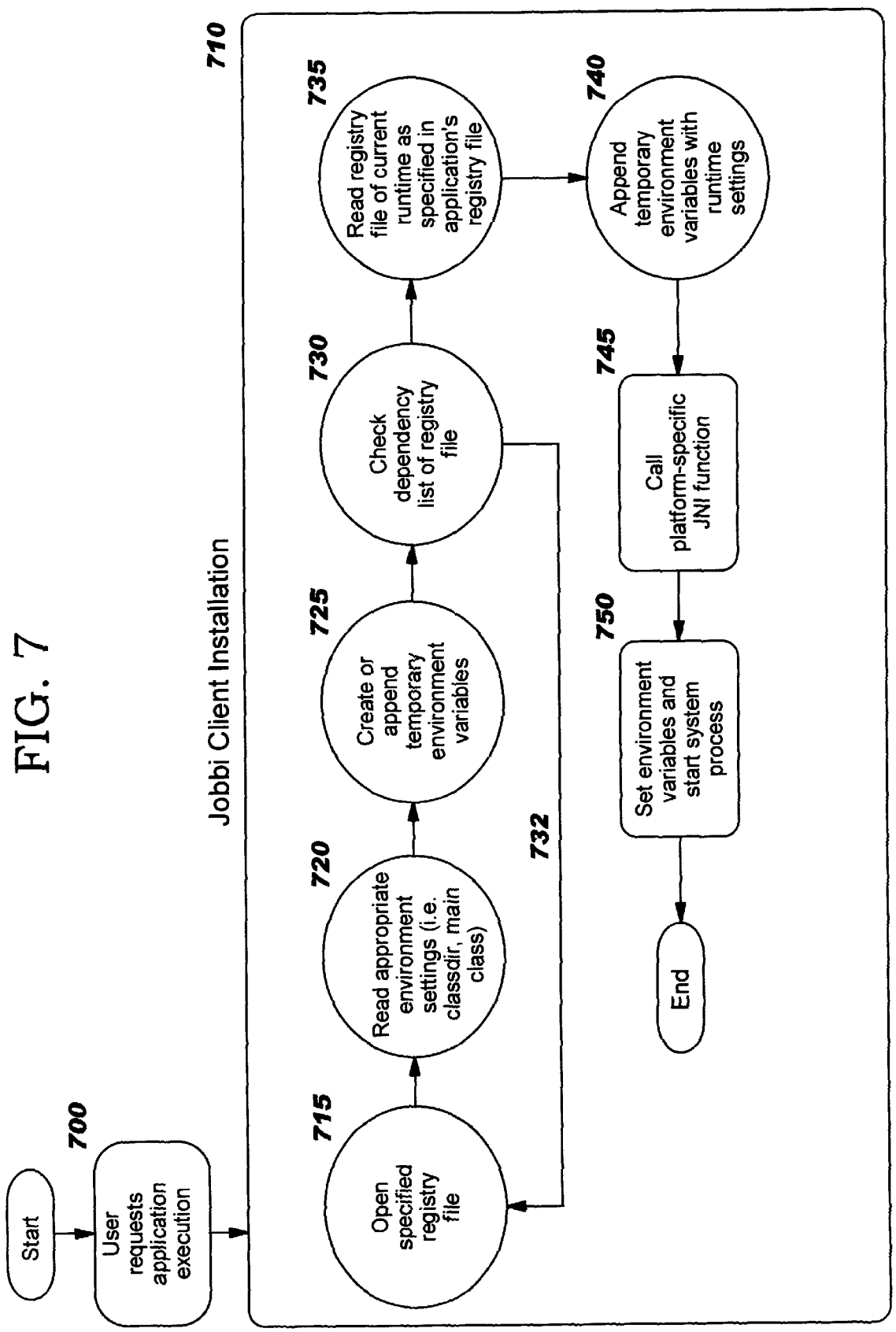
FIG. 7 depicts the logic invoked in the preferred embodiment when an application program is launched on a client computer.

FIG. 7 depicts the logic invoked in the preferred embodiment when an application program is launched on a client computer. The process begins at Block 700, when a user requests to execute an application, and takes place on the client machine (as noted at element 710). The manner in which the user requests the application does not form part of the present invention. The user may click on an icon representing the application (such as the display icon 620 identified in the registry file), select an application identifier (such as the display name 615) from a pop-up or pull-down list, invoke the application using timer-driven lists, etc. At Block 715, the process of constructing the appropriate run-time environment for the application, and starting the application executing in that environment, begins. As will be illustrated, the user is required to know little or nothing about how the run-time environment operates. Block 715 opens the registry file associated with the requested application, which contains information as described with reference to FIGS. 6A and 6B. Platform-specific logic will be invoked at Blocks 720 and 725 to process the environment data from the registry file. For example, the classdir entry 625 will be appended to the classpath variable, and the working directory will be set using information from entry 635. Block 730 then checks the dependency list 655, to ensure that all dependencies are installed. If not, then the installation process of FIG. 5 will preferably be invoked. For those dependencies which are installed, a recursive invocation of the logic in FIG. 7 is performed as shown at 732, setting the appropriate information for using the dependencies. When all dependency information has been processed, control transfers to Block 735. The current run-time entry 645 of the application's registry file is extracted, and the value is used to retrieve the registry file for that run-time. Block 740 then uses information from the run-time's registry, and uses the appropriate settings for environment variables (such as appending directories to the libpath and binpath, etc.).

At Block 745, a platform-dependent JNI (Java Native Interface) is invoked. As is known in the art, the JNI is a standard, virtual machine independent interface used to enable Java applications to call native libraries of code written in other languages such as C or C++. The appropriate environment variables and application parameters are passed on this invocation, enabling Block 750 to finalize the setting of environment variables and then start the system process with the application program executing within it. The process of FIG. 7 then ends, and the program executes normally. As has been demonstrated, the novel techniques of the present invention enable the proper run-time to be used for an application, which may include changing the run-time dynamically as each different application is selected for execution.

Figure 8:
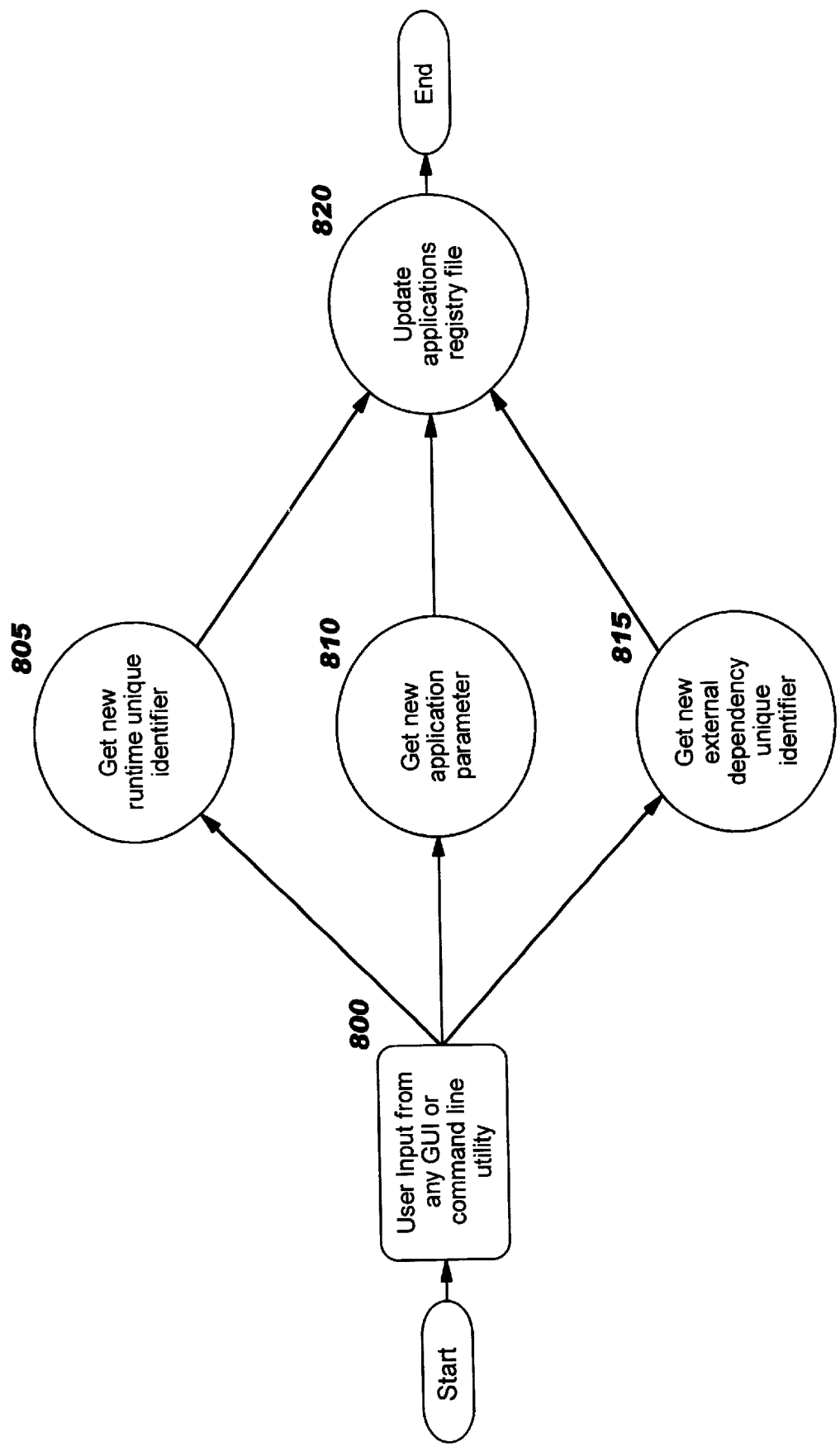
FIG. 8 depicts the logic with which run-time information may be updated after an application program has been installed.

The run-time environment for an application can be easily changed using the present invention, according to the logic depicted in FIG. 8. At Block 800, user input is entered from a graphical user interface (GUI), command line, etc., requesting to change information in the registry file. (Alternatively, means may be provided with which a systems administrator can force information updates on one or more client machines. For example, if a new run-time environment is being downloaded throughout an organization, the systems administrator may update all client registry files to use this new run-time. This approach will be useful to further reduce the amount of run-time knowledge required for the end users. Means for downloading information from a network location to client machines are known in the art, and will be used to invoke the logic of FIG. 8.) If the user request is to update the current run-time entry 645 in the registry, then Block 805 will accept the new run-time identifier from the user. Optionally, verification of this identifier may be performed. If the user request is to change persistently-stored application parameters 655, Block 810 will accept the new parameter values. Optionally, the parameter values may be verified by inspecting the applicable application to ensure that the number and type of parameter values is appropriate. If the user requests to change or add dependency information 650, then Block 815 will accept the new information. Optionally, the stored list of dependency identifiers may be presented to the user, along with means for identifying additions, deletions, and changes to this list. Once the user has entered the changed registry information, and any optional verifications have been performed, Block 820 updates the stored registry information for this application. The next time this application is launched, the revised information will be used when constructing the execution environment according to FIG. 7. Thus, it can be seen that changing an application program so that it uses a different run-time environment is greatly simplified as contrasted to the current art.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment capable of having a connection to a network, computer readable code readable by a computer system in said environment and embodied on one or more computer-readable media, for installing a Java application on a client machine, comprising:

a subprocess for automatically retrieving, responsive to an execution request on said client machine, a properties file for a Java application to be installed, wherein said properties file (1) describes said Java application, (2) specifies zero or more executable extensions which are required for executing said Java application, and (3) specifies a run-time environment which is required for executing said Java application;

a subprocess for installing said Java application on said client machine using said properties file; and a subprocess for automatically installing, by said client machine, one or more dependencies of said Java application, wherein said dependencies comprise said required executable extensions and said required run-time environment, further comprising:

a subprocess for parsing said properties file to locate said dependencies; and for each of said located dependencies which is not already installed on said client machine, a subprocess for automatically recursively (1) retrieving a properties file for said located dependency, (2) installing said located dependency, and (3) installing any dependencies identified when parsing said retrieved properties file of said located dependencies, provided said identified dependency is not already installed on said client machine.

2. Computer readable code according to claim 1, further comprising:

a subprocess for revising said properties file for said Java application, wherein said subprocess for automatically retrieving and said subprocess for automatically installing then use said revised properties file.

3. Computer readable code according to claim 1, wherein said subprocess for automatically installing one or more dependencies further comprises a subprocess for dynamically determining, for at least one of said dependencies, a location from which said at least one dependency is to be installed.

4. Computer readable code according to claim 1, further comprising:

a subprocess for creating a registry file on said client machine, wherein said created registry file contains entries corresponding to said properties file, said entries being tailored to said client machine; and a subprocess for using said created registry to construct said run-time environment for said Java application on said client machine.

5. Computer readable code according to claim 4, further comprising:

a subprocess for receiving a request to execute a selected Java application on said client machine;

a subprocess for constructing a proper run-time environment for said selected Java application using its corresponding registry file; and a subprocess for starting execution of said selected Java application in said constructed environment.

6. Computer readable code according to claim 5, wherein said subprocess for constructing further comprises:
- a subprocess for reading said corresponding registry file to determine current dependencies of said Java application, wherein said current dependencies comprise currently-required extensions and a current run-time environment for said Java application;
- a subprocess for ensuring that each of said current dependencies of said selected Java application is installed;
- a subprocess for setting appropriate environment variables for said current run-time environment; and
- a subprocess for setting appropriate environment variables for said currently-required extensions.

7. Computer readable code according to claim 6, further comprising a subprocess for setting one or more parameters of said selected Java application using values specified in said corresponding registry file.

8. Computer readable code according to claim 7, further comprising a subprocess for updating said parameters in said registry file.

9. Computer readable code according to claim 4, further comprising:
- a subprocess for updating said current run-time environment in said registry file; and
- a subprocess for updating said currently-required extensions in said registry file.

10. A system for installing a Java application on a client machine in a computing environment capable of having a connection to a network, comprising:
- means for automatically retrieving, responsive to an execution request on said client machine, a properties file for a Java application to be installed, wherein said properties file (1) describes said Java application, (2) specifies zero or more executable extensions which are required for executing said Java application, and (3) specifies a run-time environment which is required for executing said Java application;
- means for installing said Java application on said client machine using said properties file; and
- means for automatically installing, by said client machine, one or more dependencies of said Java application, wherein said dependencies comprise said required executable extensions and said required run-time environment, further comprising:
  - means for parsing said properties file to locate said dependencies; and
  - for each of said located dependencies which is not already installed on said client machine, means for automatically recursively (1) retrieving a properties file for said located dependency, (2) installing said located dependency, and (3) installing any dependencies identified when parsing said retrieved properties file of said located dependencies, provided said identified dependency is not already installed on said client machine.

11. The system according to claim 10, further comprising:
means for revising said properties file for said Java application, wherein said means for automatically retrieving and said means for automatically installing then use said revised properties file.

12. The system according to claim 10, wherein said means for automatically installing one or more dependencies further comprises means for dynamically determining, for at least one of said dependencies, a location from which said at least one dependency is to be installed.

13. The system according to claim 10, further comprising:
means for creating a registry file on said client machine, wherein said created registry file contains entries corresponding to said properties file, said entries being tailored to said client machine; and
means for using said created registry to construct said run-time environment for said Java application on said client machine.

14. The system according to claim 13, further comprising:
- means for receiving a request to execute a selected Java application on said client machine;
- means for constructing a proper run-time environment for said selected Java application using its corresponding registry file; and
- means for starting execution of said selected Java application in said constructed environment.

15. The system according to claim 14, wherein said means for constructing further comprises:
- means for reading said corresponding registry file to determine current dependencies of said Java application, wherein said current dependencies comprise currently-required extensions and a current run-time environment for said Java application;
- means for ensuring that each of said current dependencies of said selected Java application is installed;
- means for setting appropriate environment variables for said current run-time environment; and
- means for setting appropriate environment variables for said currently-required extensions.

16. The system according to claim 15, further comprising means for setting one or more parameters of said selected Java application using values specified in said corresponding registry file.

17. The system according to claim 16, further comprising means for updating said parameters in said registry file.

18. The system according to claim 13, further comprising:
- means for updating said current run-time environment in said registry file; and
- means for updating said currently-required extensions in said registry file.

19. A method for installing a Java application on a client machine in a computing environment capable of having a connection to a network, comprising steps of:
- automatically retrieving, responsive to an execution request on said client machine, a properties file for a Java application to be installed, wherein said properties file (1) describes said Java application, (2) specifies zero or more executable extensions which are required for executing said Java application, and (3) specifies a run-time environment which is required for executing said Java application;
- installing said Java application on said client machine using said properties file; and
- automatically installing, by said client machine, one or more dependencies of said Java application, wherein said dependencies comprise said required executable extensions and said required run-time environment, further comprising steps of:
  - parsing said properties file to locate said dependencies; and
  - for each of said located dependencies which is not already installed on said client machine, automatically recursively (1) retrieving a properties file for said located dependency, (2) installing said located dependency, and (3) installing any dependencies identified when parsing said retrieved properties file of said located dependencies, provided said identified dependency is not already installed on said client machine.

20. The method according to claim 19, further comprising the step of:
revising said properties file for said Java application, wherein said automatically retrieving step and said automatically installing step then use said revised properties file.

21. The method according to claims 19, wherein said automatically installing one or more dependencies step further comprises the step of dynamically determining, for at least one of said dependencies, a location from which said at least one dependency is to be installed.

22. The method according to claim 19, further comprising the steps of:
creating a registry file on said client machine, wherein said created registry file contains entries corresponding to said properties file, said entries being tailored to said client machine; and
using said created registry to construct said run-time environment for said Java application on said client machine.

23. The method according to claim 19, comprising the steps of:
receiving a request to execute a selected Java application on said client machine;
constructing a proper run-time environment for said selected Java application using its corresponding registry file; and
starting execution of said selected Java application in said constructed environment.

24. The method according to claim 23, wherein said constructing step further comprises the steps of:
reading said corresponding registry file to determine current dependencies of said Java application, wherein said current dependencies comprise currently-required extensions and a current run-time environment for said Java application;
ensuring that each of said current dependencies of said selected Java application is installed;
setting appropriate environment variables for said current run-time environment; and
setting appropriate environment variables for said currently-required extensions.

25. The method according to claim 24, further comprising the step of setting one or more parameters of said selected Java application using values specified in said corresponding registry file.

26. The method according to claim 25, further comprising the step of updating said parameters in said registry file.

27. The method according to claim 22, further comprising the steps of:
updating said current run-time environment in said registry file; and
updating said currently-required extensions in said registry file.

28. The method according to claim 19, wherein said Java application is a Java applet.

29. A method for improving manageability and usability of a Java environment in a computing environment, comprising steps of:
storing an identification of one or more dependencies of a Java application, wherein said dependencies comprise a run-time environment, other than a browser, which is required for executing said application and zero or more extensions required for executing said application; and
installing said Java application, wherein said installing step further comprises the step of using said stored identification to automatically locate and install said dependencies of said Java application.

30. A method of enabling an applet to execute outside a browser, comprising steps of:
storing information pertaining to execution of said applet, wherein said information comprises: (1) an identification of one or more permissible run-time environments in which said applet may be executed, other than said browser; and (2) an identification of zero or more executable extensions on which said applet is dependent, as well as a corresponding location from which each of said identified executable extensions may be installed; and
installing said applet using said stored information.

31. The method of enabling an applet to execute outside a browser according to claim 30, wherein said installing step further comprises steps of
ensuring that a selected one of said permissible run-time environments is available; and
ensuring that each of said identified executable extensions is installed, and installing, from the corresponding location, any of said identified executable extensions that are not already installed.

32. The method of enabling an applet to execute outside a browser according to claim 31, further comprising the step of executing said installed applet using said selected one of said permissible run-time environments and said installed executable extensions.

33. A method for executing a Java application without using a browser on a client machine in a computing environment capable of having a connection to a network, comprising steps of:
requesting, by a user, execution of a selected Java application on said client machine;
constructing, by said client machine responsive to said request, a run-time environment for said selected Java application using information retrieved from a registry file, wherein said registry file contains entries specifying values for properties of said selected Java application, said values of said entries being tailored to said client machine, further comprising steps of:
setting environment data using environment data values from said registry file;
automatically installing one or more dependencies of said selected Java application using dependency data values from said registry file, further comprising steps of:
for each of said dependencies which is not already installed on said client machine, automatically recursively (1) retrieving a properties file for said dependency, (2) installing said dependency, (3) constructing a run-time environment for said dependency using information retrieved from its registry file, and (4) installing any dependencies identified in said retrieved properties file of said dependencies, provided said identified dependency is not already installed on said client machine;
automatically locating a run-time registry file for a current run-time specified in said registry file of said selected Java application;
setting environment data using environment data values from said located run-time registry file; and
invoking a virtual-machine independent interface for calling native libraries of code in said run-time environment; and
executing said selected Java application in said constructed run-time environment.

* * * * *